(12) United States Patent
Garrett

(10) Patent No.: US 9,310,056 B2
(45) Date of Patent: Apr. 12, 2016

(54) LIGHT FIXTURE ASSEMBLY

(71) Applicant: Kelly Garrett, Irvington, NJ (US)

(72) Inventor: Kelly Garrett, Irvington, NJ (US)

( * ) Notice: Subject to any disclaimer, the term of this patent is extended or adjusted under 35 U.S.C. 154(b) by 123 days.

(21) Appl. No.: 14/449,336

(22) Filed: Aug. 1, 2014

(65) Prior Publication Data

US 2016/0033114 A1 Feb. 4, 2016

(51) Int. Cl.
| | |
|---|---|
| *F21V 21/00* | (2006.01) |
| *F21V 15/01* | (2006.01) |
| *F21L 4/02* | (2006.01) |
| *F21V 27/00* | (2006.01) |
| *B60Q 1/46* | (2006.01) |

(52) U.S. Cl.
CPC . *F21V 15/01* (2013.01); *B60Q 1/46* (2013.01); *F21L 4/02* (2013.01); *F21V 27/005* (2013.01)

(58) Field of Classification Search
CPC .......... F21V 15/01; F21V 27/005; F21L 4/02; B60Q 1/46
USPC .................................................... 362/249.01
See application file for complete search history.

(56) References Cited

U.S. PATENT DOCUMENTS

| | | | | | |
|---|---|---|---|---|---|
| 2,932,018 | A * | 4/1960 | Schwartz | ............... | B60Q 3/007 307/28 |
| 3,372,503 | A * | 3/1968 | Weeks | ..................... | G09F 7/002 116/28 R |
| 3,593,016 | A | 7/1971 | Gerdel | | |
| 3,936,967 | A * | 2/1976 | Davis | ..................... | B60Q 7/005 40/592 |
| 4,157,531 | A * | 6/1979 | Mont | ....................... | B60Q 7/02 116/63 P |
| D280,029 | S | 8/1985 | Petterson | | |
| 4,613,847 | A * | 9/1986 | Scolari | ..................... | B60Q 7/00 116/63 C |
| 4,633,215 | A * | 12/1986 | Anders | ................... | B60Q 1/486 116/173 |
| 4,776,766 | A | 10/1988 | Brent | | |
| 4,875,028 | A | 10/1989 | Chou | | |
| 4,999,752 | A | 3/1991 | Rogers et al. | | |
| 5,019,798 | A * | 5/1991 | Pherigo, Jr. | ............... | G08B 7/06 340/321 |
| 5,043,855 | A * | 8/1991 | Yelvington | .............. | B60Q 7/00 362/276 |
| 5,349,346 | A * | 9/1994 | Wu | ........................... | B60Q 7/00 116/63 T |
| 5,512,876 | A * | 4/1996 | Brusca | ..................... | H01H 3/00 116/63 P |
| 5,585,783 | A * | 12/1996 | Hall | ........................ | B60Q 7/00 340/473 |
| 5,627,513 | A * | 5/1997 | Weed | ....................... | B60Q 7/00 116/63 P |
| 5,651,636 | A * | 7/1997 | Yeh | ........................ | E01F 9/0122 116/63 T |
| 5,775,253 | A * | 7/1998 | Quan | ....................... | E01F 9/012 116/63 P |
| 5,961,207 | A | 10/1999 | Petkovic | | |
| D419,701 | S * | 1/2000 | Schifrin | ......................... | D26/26 |
| 6,763,778 | B2 * | 7/2004 | Bergquist | ............... | B60Q 1/302 116/28 R |
| 7,789,523 | B2 | 9/2010 | Arnold, III | | |

FOREIGN PATENT DOCUMENTS

CN 203258395 U 10/2013

* cited by examiner

*Primary Examiner* — Ali Alavi

(57) ABSTRACT

A light fixture assembly for providing a light source when conducting vehicle repair in a dark environment includes a housing that may be positioned on a vehicle. A lid is coupled to the housing. The lid closes the housing. A first light emitter is coupled to the housing. The first light emitter emits light when the lid is open so a work area is illuminated. A second light emitter is coupled to the housing. The second light emitter emits light when the lid is closed so an observer is notified of a hazard.

13 Claims, 5 Drawing Sheets

LIGHT FIXTURE ASSEMBLY

BACKGROUND OF THE DISCLOSURE

Field of the Disclosure

The disclosure relates to light fixture devices and more particularly pertains to a new light fixture device for providing a light source when conducting vehicle repair in a dark environment.

SUMMARY OF THE DISCLOSURE

An embodiment of the disclosure meets the needs presented above by generally comprising a housing that may be positioned on a vehicle. A lid is coupled to the housing. The lid closes the housing. A first light emitter is coupled to the housing. The first light emitter emits light when the lid is open so a work area is illuminated. A second light emitter is coupled to the housing. The second light emitter emits light when the lid is closed so an observer is notified of a hazard.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
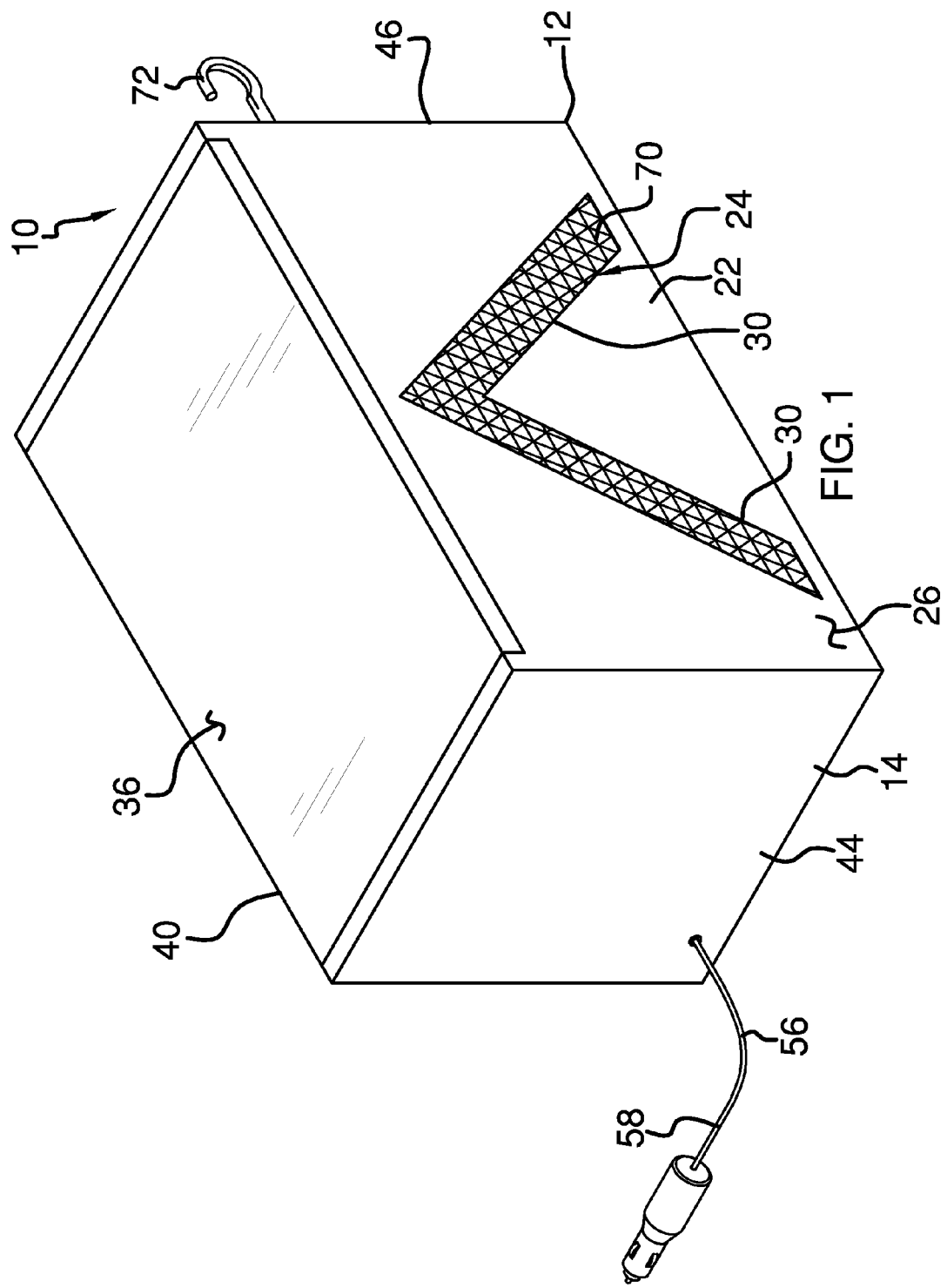
FIG. 1 is a perspective view of a light fixture assembly according to an embodiment of the disclosure.
Figure 2:
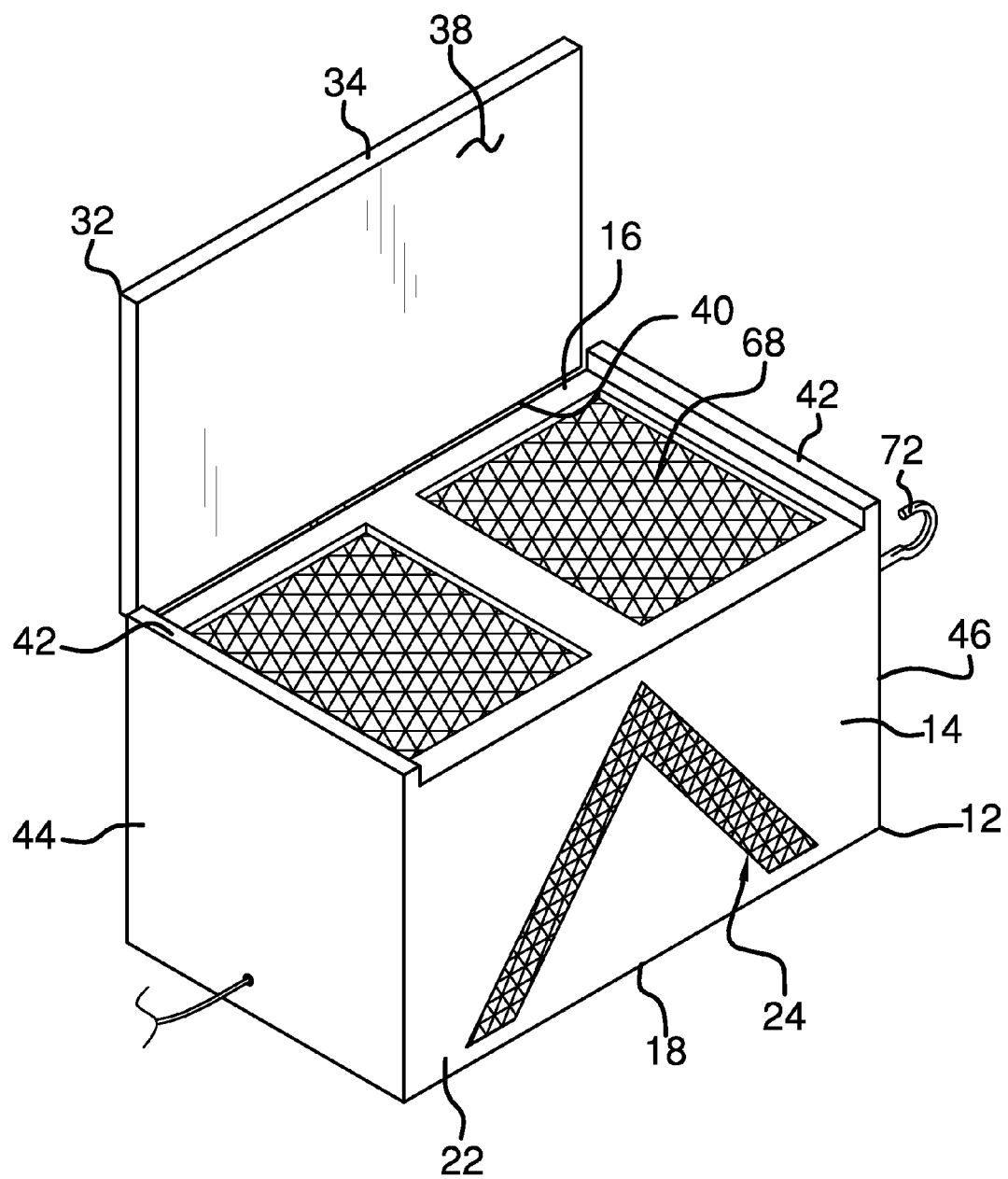
FIG. 2 is a top perspective view of an embodiment of the disclosure.
Figure 3:
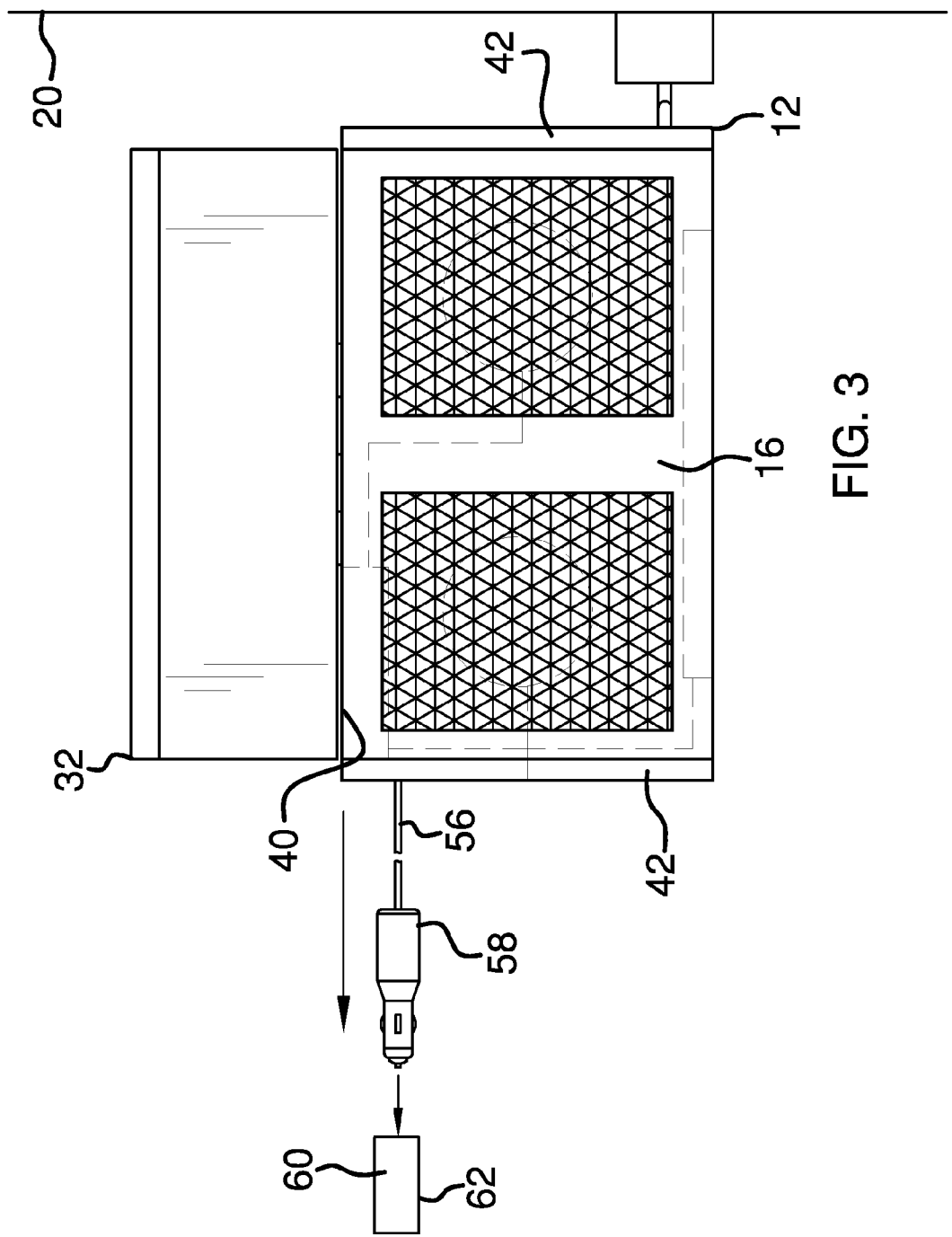
FIG. 3 is a top view of an embodiment of the disclosure.
Figure 4:
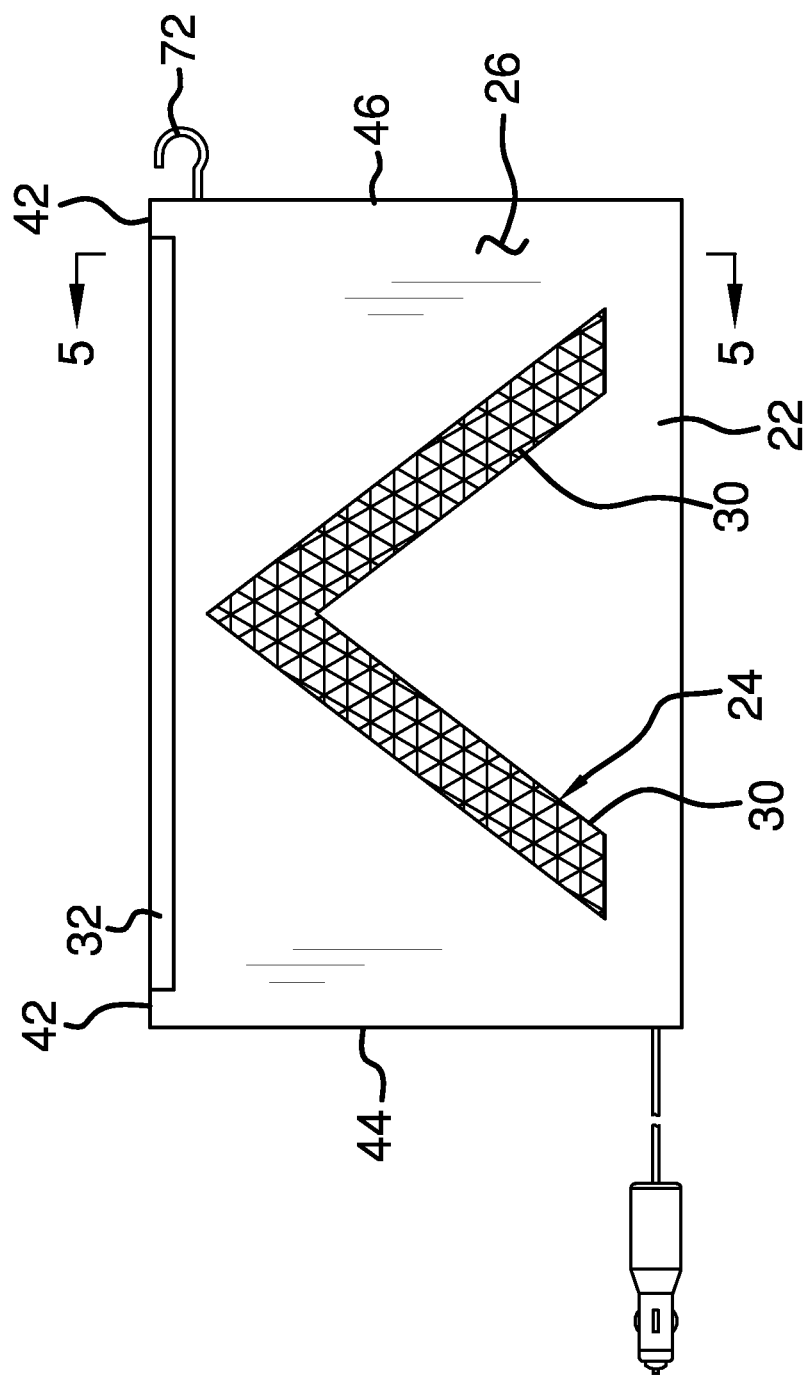
FIG. 4 is a front view of an embodiment of the disclosure.
Figure 5:
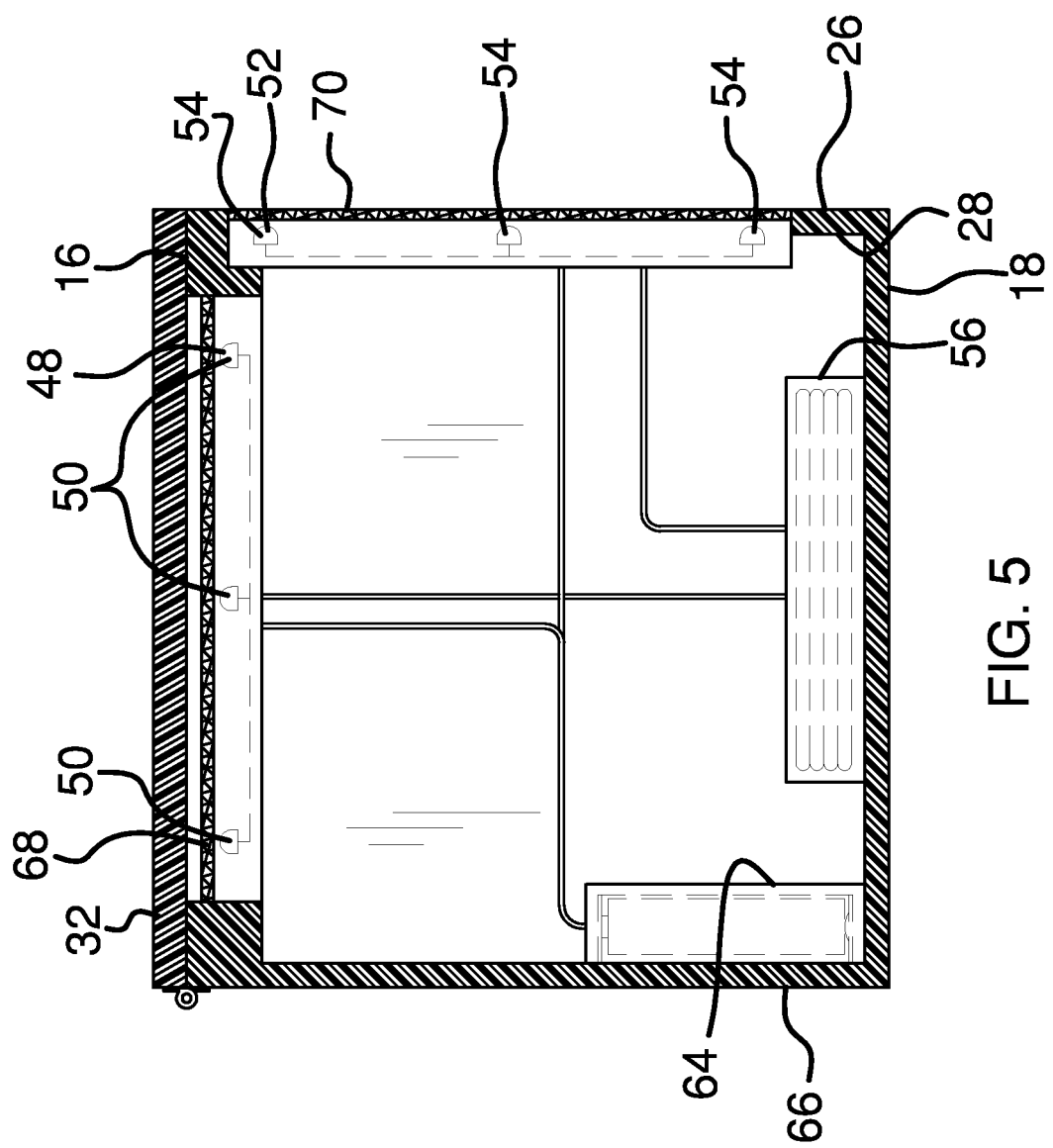
FIG. 5 is a cross sectional view of an embodiment of the disclosure.

With reference now to the drawings, and in particular to FIGS. 1 through 5 thereof, a new light fixture device embodying the principles and concepts of an embodiment of the disclosure and generally designated by the reference numeral 10 will be described.

As best illustrated in FIGS. 1 through 5, the light fixture assembly 10 generally comprises a housing 12 that has an outer wall 14, a top wall 16 and a bottom wall 18. The outer wall 14 of the housing 12 extends between each of the top 16 and bottom 18 walls of the housing 12. The top wall 16 of the housing 12 is open. The housing 12 may be positioned on a vehicle 20.

A front side 22 of the outer wall 14 of the housing 12 has an opening 24 extending through a front surface 26 and a back surface 28 of the front side 22 of the outer wall 14 of the housing 12. The opening 24 has a pair of arms 30 extending away from each other at an angle. The opening 24 has a chevron shape. Additionally, the opening 24 is centrally positioned on the front side 22 of the outer wall 14 of the housing 12.

A lid 32 is provided. The lid 32 has an outer edge 34 extending between each of a top surface 36 and a bottom surface 38 of the lid 32. A back side 40 of the outer edge 34 of the lid 32 is hingedly coupled to the outer wall 14 of the housing 12. The lid 32 selectively covers the top wall 16 of the housing 12.

A pair of lips 42 extends upwardly from the top wall 16 of the housing 12. Each of the pair of lips 42 is positioned adjacent to an associated one of a first lateral side 44 and a second lateral side 46 of the outer wall 14 of the housing 12. The lid 32 extends between each of the pair of lips 42 when the lid 32 is in a closed position.

A first light emitter 48 is coupled to the outer wall 14 of housing 12. The first light emitter 48 is positioned within an interior of the housing 12. The first light emitter 48 emits light through the top wall 16 of the housing 12 when the lid 32 is positioned in an open position. The first light emitter 48 illuminates a work area.

The first light emitter 48 is one of a plurality of first light emitters 50. The plurality of first light emitters 50 is evenly spaced apart and distributed around the top wall 16 of the housing 12. The plurality of first light emitters 48 may each comprise an LED of any conventional design.

A second light emitter 52 is coupled to the front side 22 of the outer wall 14 of the housing 12. The second light emitter 52 is positioned within an interior of the housing 12. Moreover, the second light emitter 52 emits light through the opening 24 when the lid 32 is positioned in a closed position. An observer is notified of a hazard.

The second light emitter 52 is one of a plurality of second light emitters 54. The plurality of second light emitters 54 is evenly spaced apart and distributed around the opening 24 in the front side 22 of the outer wall 14 of the housing 12. The plurality of second light emitters 54 may each comprise an LED of any conventional design.

A primary power supply 56 is coupled to the housing 12. The primary power supply 56 is electrically coupled to each of the plurality of first 50 and second 54 light emitters. Moreover, the primary power supply 56 comprises a power cord 58 retractably coupled to the housing 12. The power cord 58 is selectively electrically coupled to the vehicle's electrical system 60. The power cord 58 may be electrically coupled to the vehicle's cigarette lighter 62.

A secondary power supply 64 is coupled to the housing 12. The secondary power supply 64 is electrically coupled to each of the plurality of first 50 and second 54 light emitters. The secondary power supply 64 comprises at least one battery 66.

A first window 68 is coupled to the top wall 16 of the housing 12. The first window 68 completely covers the top wall 16 of the housing 12. Additionally, the first window 68 may have a clear color so the plurality of first light emitters 50 emits full spectrum light.

A second window 70 is coupled to the front side 22 of the outer wall 14 of the housing 12. The second window 70 completely covers the opening 24 in the front side 22 of the outer wall 14 of the housing 12. Moreover, the second window 70 may have a red color the plurality of second light emitters 54 emits a red light.

A hook 72 is coupled to the second lateral side 46 of the outer wall 14 of the housing 12. The hook 72 is positioned proximate the top wall 16 of the housing 12. The hook 72 engages the vehicle 20 so the housing 12 is retained proximate the work area.

In use, the hook 72 is coupled to the vehicle 20 so the housing 12 is positioned proximate the work area. The power cord 58 is electrically coupled to the vehicle's electrical system 60. The secondary power supply 64 is utilized if the power cord 58 cannot be electrically coupled to the vehicle electrical system 60. The lid 32 is positioned on the open position to illuminate the work area. Additionally, the housing 12 is positionable so the opening is visible to the observer. The plurality of second light emitters 54 notifies the observer of the hazard.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A light fixture assembly configured to provide a light source when conducting vehicle repair in a dark environment, said assembly comprising:
   a housing configured to be positioned on the vehicle;
   a lid coupled to said housing such that said lid closes said housing;
   a first light emitter coupled to said housing, said first light emitter emitting light when said lid is open such that a work area is illuminated; and
   a second light emitter coupled to said housing, said second light emitter emitting light when said lid is closed such that an observer is notified of a hazard.

2. The assembly according to claim 1, wherein said housing having an outer wall, a top wall and a bottom wall, said outer wall of said housing extending between each of said top and bottom walls of said housing, said top wall of said housing being open.

3. The assembly according to claim 2, further comprising said lid having an outer edge extending between each of a top surface and a bottom surface of said lid, a back side of said outer edge of said lid being hingedly coupled to said outer wall of said housing such that said lid selectively covers said top wall of said housing.

4. The assembly according to claim 2, further comprising said first light emitter being positioned within an interior of said housing such that said first light emitter emits light through said top wall of said housing when said lid is positioned in an open position.

5. The assembly according to claim 2, wherein a front side of said outer wall of said housing has an opening extending through a front surface and a back surface of said front side of said outer wall of said housing.

6. The assembly according to claim 1, further comprising said second light emitter being positioned within an interior of said housing such that said second light emitter emits light through said opening when said lid is positioned in a closed position.

7. The assembly according to claim 1, wherein a primary power supply is coupled to said housing.

8. The assembly according to claim 7, further comprising said primary power supply being electrically coupled to each of said first and second light emitters.

9. The assembly according to claim 8, further comprising said primary power supply comprising a power cord retractably coupled to said housing, said primary power cord being selectively electrically coupled to the vehicle's electrical system.

10. The assembly according to claim 1, wherein a secondary power supply coupled to said housing.

11. The assembly according to claim 10, further comprising said secondary power supply being electrically coupled to each of said first and second light emitters.

12. The assembly according to claim 11, further comprising said secondary power supply comprising at least one battery.

13. A light fixture assembly configured to provide a light source when conducting vehicle repair in a dark environment, said assembly comprising:
   a housing having an outer wall, a top wall and a bottom wall, said outer wall of said housing extending between each of said top and bottom walls of said housing, said top wall of said housing being open, said housing being configured to be positioned on the vehicle;
   a front side of said outer wall of said housing having an opening extending through a front surface and a back surface of said front side of said outer wall of said housing;
   a lid having an outer edge extending between each of a top surface and a bottom surface of said lid, a back side of said outer edge of said lid being hingedly coupled to said outer wall of said housing such that said lid selectively covers said top wall of said housing;
   a first light emitter coupled to said housing, said first light emitter being positioned within an interior of said housing such that said first light emitter emits light through said top wall of said housing when said lid is positioned in an open position such that a work area is illuminated;
   a second light emitter coupled to said housing, said second light emitter being positioned within an interior of said housing such that said second light emitter emits light through said opening when said lid is positioned in a closed position such that an observer is notified of a hazard;
   a primary power supply coupled to said housing, said primary power supply being electrically coupled to each of said first and second light emitters, said primary power supply comprising a power cord retractably coupled to said housing, said primary power cord being selectively electrically coupled to the vehicle's electrical system; and
   a secondary power supply coupled to said housing, said secondary power supply being electrically coupled to each of said first and second light emitters, said secondary power supply comprising at least one battery.

* * * * *